United States Patent
Nowak et al.

(10) Patent No.: US 11,554,328 B2
(45) Date of Patent: Jan. 17, 2023

(54) BUBBLE PROMOTER

(71) Applicant: UOP LLC, Des Plaines, IL (US)

(72) Inventors: Brian J. Nowak, Orchard Park, NY (US); Zhanping Xu, Inverness, IL (US); Peter J. Wantuck, Springville, NY (US)

(73) Assignee: UOP LLC, Des Plaines, IL (US)

( * ) Notice: Subject to any disclaimer, the term of this patent is extended or adjusted under 35 U.S.C. 154(b) by 49 days.

(21) Appl. No.: 16/811,103

(22) Filed: Mar. 6, 2020

(65) Prior Publication Data

US 2021/0275938 A1    Sep. 9, 2021

(51) Int. Cl.
*B01D 3/18* (2006.01)
*B01D 3/32* (2006.01)
*B01D 3/16* (2006.01)

(52) U.S. Cl.
CPC .............. *B01D 3/18* (2013.01); *B01D 3/163* (2013.01); *B01D 3/326* (2013.01)

(58) Field of Classification Search
CPC ........... B01D 3/18; B01D 3/163; B01D 3/326
USPC .......... 261/114.1, 114.2, 114.3, 114.4, 114.5
See application file for complete search history.

(56) References Cited

U.S. PATENT DOCUMENTS

| | | | | |
|---|---|---|---|---|
| 4,174,363 A * | 11/1979 | Bruckert | ................ | B01D 3/326 |
| | | | | 261/114.1 |
| 5,049,319 A * | 9/1991 | Nye | ......................... | B01D 3/20 |
| | | | | 261/114.1 |
| 5,453,222 A * | 9/1995 | Lee | .......................... | B01D 3/20 |
| | | | | 261/114.1 |
| 5,547,617 A * | 8/1996 | Lee | ......................... | B01D 3/326 |
| | | | | 261/114.5 |
| 6,003,847 A | 12/1999 | Lee et al. | | |
| 6,189,872 B1 * | 2/2001 | Chuang | .................. | B01D 3/163 |
| | | | | 261/114.3 |
| 6,736,378 B2 | 5/2004 | Colic et al. | | |
| 6,799,752 B2 | 10/2004 | Wu et al. | | |
| 7,204,477 B2 | 4/2007 | Ku et al. | | |
| 8,430,380 B2 * | 4/2013 | Binkley | ................. | B01D 3/163 |
| | | | | 261/114.4 |
| 11,148,069 B2 * | 10/2021 | Xu | ............................ | B01D 3/20 |
| 2002/0163091 A1 | 11/2002 | Wu et al. | | |
| 2003/0010478 A1 | 1/2003 | Colic et al. | | |

(Continued)

FOREIGN PATENT DOCUMENTS

| | | |
|---|---|---|
| CN | 208081887 U | 11/2018 |
| EP | 1622692 B1 | 9/2006 |
| WO | 2006130427 A1 | 12/2006 |

OTHER PUBLICATIONS

International Search Report from corresponding PCT application No. PCT/US2021/020267 dated May 27, 2021.

(Continued)

*Primary Examiner* — Charles S Bushey (57) ABSTRACT

Trays having increased capacity and efficiency are described. The trays have a deck, and downcomers extending through the deck. There are a plurality of bubble promoters on the deck. Each bubble promoter defines a zone on the deck, and the zone has an opening in the deck. The opening is positioned adjacent to a solid support for the tray. The bubble promoters provide areas through which vapor can pass, turning blocked areas of the tray into active areas. Mass transfer columns containing the trays are also described.

16 Claims, 5 Drawing Sheets

(56) References Cited

U.S. PATENT DOCUMENTS

| | | | |
|---|---|---|---|
| 2010/0244290 A1* | 9/2010 | Xu .................. | B01D 3/225 |
| | | | 261/114.1 |
| 2021/0170300 A1* | 6/2021 | Xu .................. | B01D 3/324 |

OTHER PUBLICATIONS

Written Opinion from corresponding PCT application No. PCT/US2021/020267 completed May 20, 2021.

* cited by examiner (Prior Art)

BUBBLE PROMOTER

BACKGROUND

Figure 1:
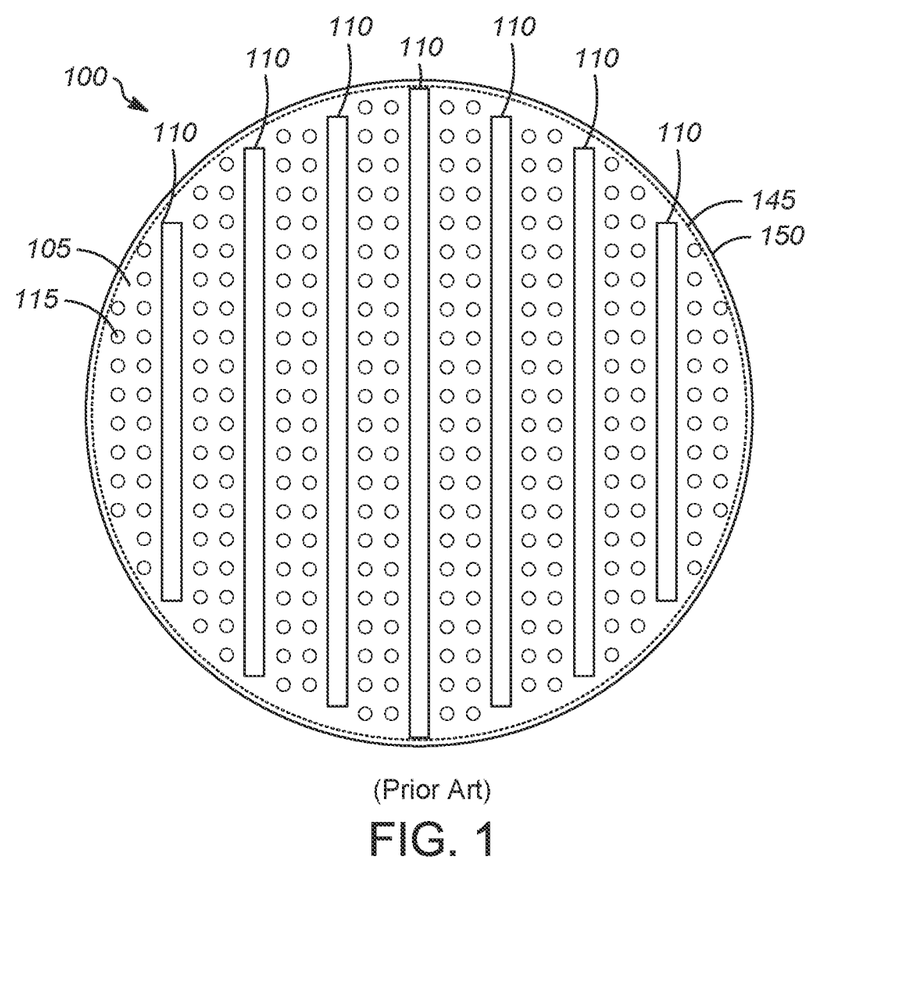
FIG. 1 is an illustration of a tray.

FIG. 1 shows a design of a multiple downcomer tray 100. It is composed of deck 105 and terminated downcomers 110. The deck 105 has perforations 115. Downcomers 110 extend across the column cross section and are supported by support ring 145. The support ring 145 is attached to column wall 150. The deck 105 is supported by the downcomers 110 and the support ring 145.

The active area for vapor-liquid contacting on tray 100 is approximately 70-90% of the column cross-sectional area. The rest of the column cross-sectional area is blocked by the downcomers 110, tray support ring 145 and deck supports on the sides of downcomers (not shown).

It would be desirable to have a tray with a higher capacity than existing trays to increase throughput in existing columns.

DETAILED DESCRIPTION

The capacity of distillation trays has been increased by adding bubble promoters over the support ring, support beams, or other areas on the tray where vapor flow is blocked or restricted. The invention converts vapor blocked areas (dead areas) of the tray, which can be 5-10% of the column area, into areas through which vapor can pass (active areas). This expands the tray active area for vapor-liquid flow, contact, and separation.

Adding the bubble promoters on the tray dead areas also increases the efficiency of the tray. The bubble promoters promote uniform vapor and liquid flow and contact on the deck above the support ring, support beams, or other dead areas.

On aspect of the invention is a tray. In one embodiment, the tray comprises: a deck; at least one downcomer; a plurality of bubble promoters, each bubble promoter defining a zone on the deck, the zone having at least one opening in the deck, the opening being positioned adjacent to a solid support for the tray, a total active open area under the bubble promoter being greater than or equal to a total open area of the bubble promoter.

In some embodiments, the solid support comprises a support ring located around a circumference of a column and wherein the bubble promoters are positioned adjacent to an outer edge of the tray and across at least a portion of the support ring, the opening being positioned adjacent to the support ring.

In some embodiments, the solid support comprises a support beam extending across at least a portion of a column, and wherein the bubble promoters are positioned across at least a portion of the deck above the support beam, the opening being positioned adjacent to the support beam.

In some embodiments, at least one bubble promoter comprises a pair of side walls, a pair of end walls, a top, and an open bottom.

In some embodiments, there are perforations in the side walls, the end walls, and the top.

In some embodiments, the height of one side is different from the height of the other side, or the height of one end is different from the height of the other end, or both.

In some embodiments, the side walls are parallel, or the end walls are parallel, or both.

In some embodiments, the side walls are not parallel, or the end walls are not parallel, or both.

In some embodiments, the open area inside the bubble promoter between the top of the bubble promoter and the deck is greater than or equal to the total open area of a portion of the one bubble promoter directly above the solid support.

Another aspect of the invention is a mass transfer column. In one embodiments, the mass transfer column comprises: a tray comprising: a deck; at least one downcomer; a plurality of bubble promoters, each bubble promoter defining a zone on the deck, the zone having an opening in the deck; a support ring for the tray connected to the inside of the column, the opening in the deck being positioned adjacent to the support ring for the tray; and a clip positioned under the support ring and the deck, the clip securing the deck and the bubble promoter to the support ring with a connector through the clip, the deck, and the bubble promoter.

In some embodiments, the connector is a bolt.

In some embodiments, the plurality of bubble promoters are positioned adjacent to an outer edge of the tray, the opening being positioned adjacent to the support ring.

In some embodiments, the column further comprises a support beam extending across at least a portion of the column, and wherein a second bubble promoter is positioned across at least a portion of the deck above the support beam, the second bubble promoter defining a second zone on the deck, the second zone having a second opening in the deck, the second opening being positioned adjacent to the support beam.

In some embodiments, at least one bubble promoter comprises a pair of side walls, a pair of end walls, a top, and an open bottom.

In some embodiments, there are perforations in the side walls, the end walls, and the top.

In some embodiments, the total active open area under one bubble promoter is greater than or equal to the total open area of the one bubble promoter.

In some embodiments, the open area inside the bubble promoter between the top of the bubble promoter and the deck is greater than or equal to the total open area of the portion of the one bubble promoter directly above the solid support.

Another aspect of the invention is a tray. In one embodiment, the tray comprises: a perforated deck; at least one downcomer; a plurality of bubble promoters, each bubble promoter defining a zone on the deck, the zone having at least one opening in the deck, the opening being positioned adjacent to a solid support for the tray, a total active open area under the bubble promoter being greater than or equal to a total open area of the bubble promoter, and an open area inside the bubble promoter between a top of the bubble promoter and the deck being greater than or equal to a total open area of a portion of the one bubble promoter directly above the solid support.

In some embodiments, the solid support comprises a support ring located around a circumference of a column and wherein the bubble promoters are positioned adjacent to an outer edge of the tray and across at least a portion of the support ring, the opening being positioned adjacent to the support ring.

In some embodiments, the solid support comprises a support beam extending across at least a portion of a column, and wherein the bubble promoters are positioned across at least a portion of the deck above the support beam, the opening being positioned adjacent to the support beam.

For ease of description, the following description relates to bubble promoters used in connection with a support ring. However, those of skill in the art will recognize that the invention is not limited to use with support rings. It can be also be used with support beams or other areas such as deck joints where vapor flow is blocked or restricted.

Figure 2:
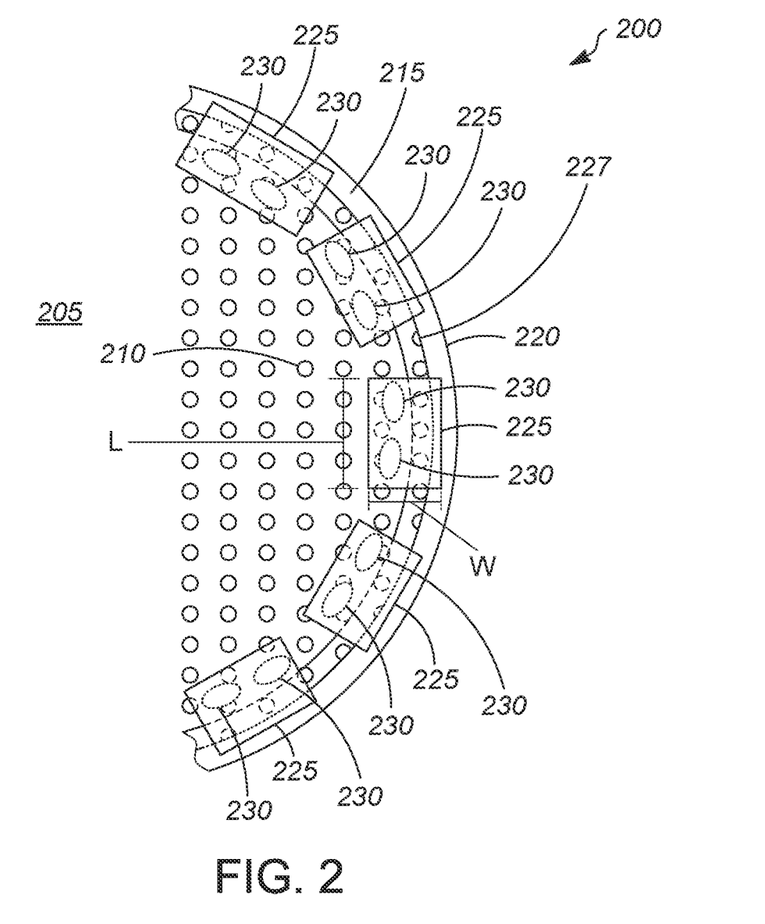
FIG. 2 is an illustration of a portion of a tray with support ring bubble promoters.
Figure 3:
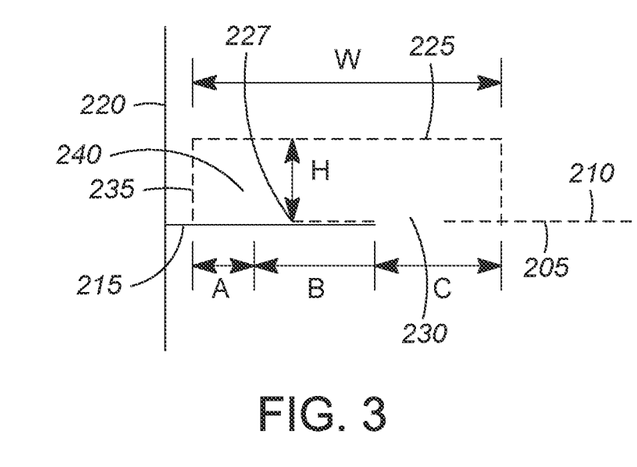
FIG. 3 is a side view of the support ring, deck, and support ring bubble promoter.

FIGS. 2-3 show a portion of the edge of a tray 200. The deck 205 has perforations 210 for vapor flow through the tray 200. By "perforations," we mean there are holes through the deck, or holes with valves or the like attached.

Figure 6A:
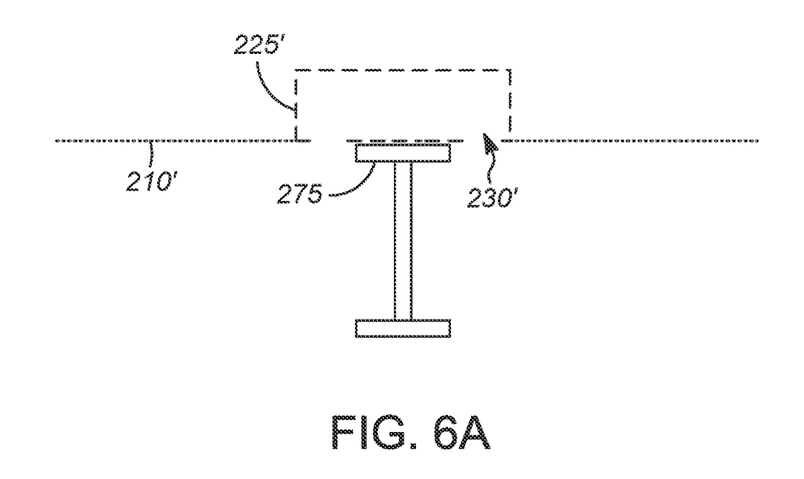
FIG. 6A is a side view of the support beam, deck, and support beam bubble promoter.
Figure 6B:
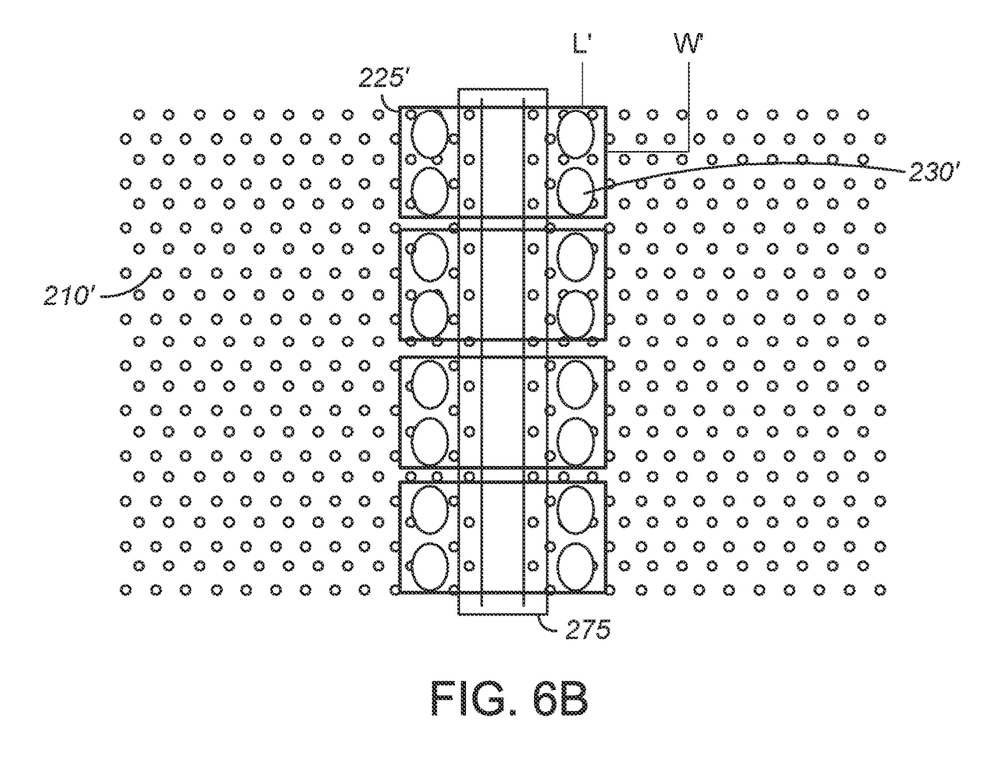
FIG. 6B is an illustration of a portion of a tray with support beam bubble promoters.

As shown in FIGS. 2 and 6B, the perforations 210, 210' have a substantially uniform size to allow vapor to flow through the tray deck 205.

Support ring 215 is attached to the column wall 220, and the deck 205 is attached to the support ring 215. There are bubble promoters 225 arranged around the circumference of the deck 205 at the edge 227 of the tray 200.

Figure 4:
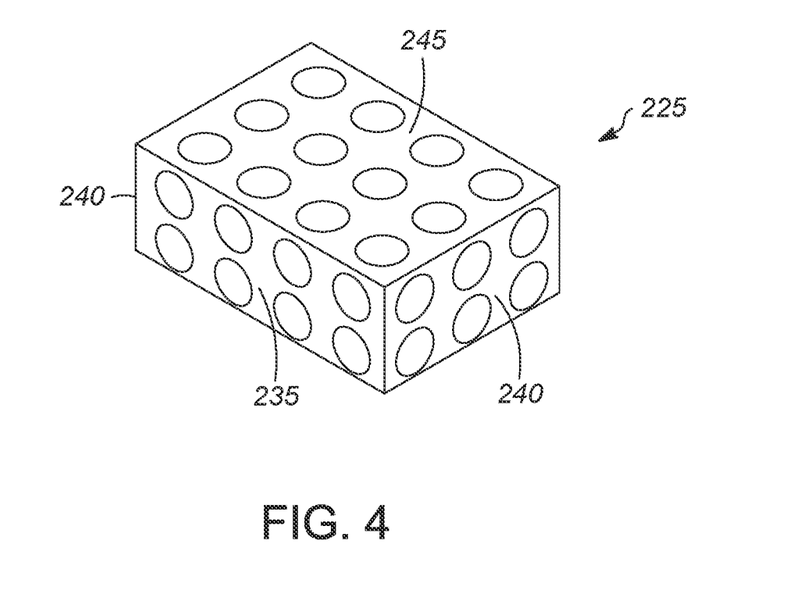
FIG. 4 is an illustration of one embodiment of a bubble promoter.
Figure 6C:
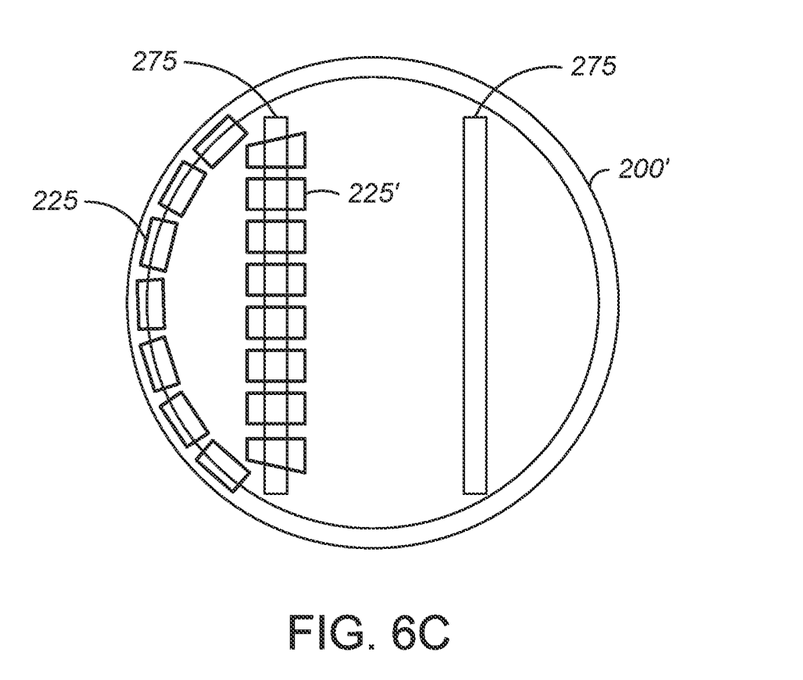
FIG. 6C is an illustration of a portion of a tray with support ring bubble promoters and support beam bubble promoters.

As shown in FIG. 4, the bubble promoter 225 typically has a pair of sides 235, a pair of ends 240, and a top 245. The bottom is open. There are perforations in sides 235, ends 240, and top 245. In some embodiments, the sides 235 are parallel, and the ends 240 are parallel. In other embodiments, the sides 235 and/or the ends 240 are not parallel, as shown in FIG. 6C. In some embodiments, the sides can be curved, e.g., to match the curvature of the reactor wall 220, if desired.

Figure 7A:
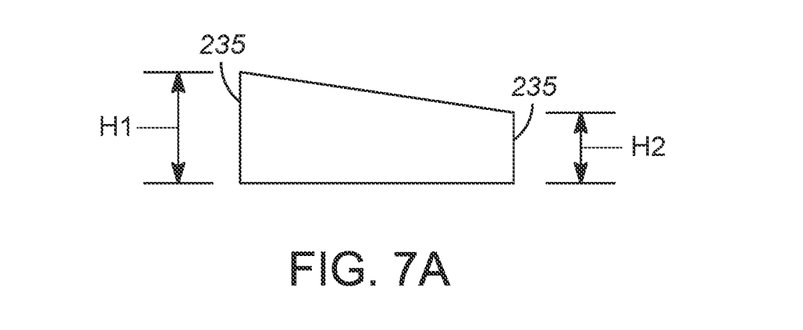
FIG. 7A is an illustration of a bubble promoter with one side higher than the other.
Figure 7B:
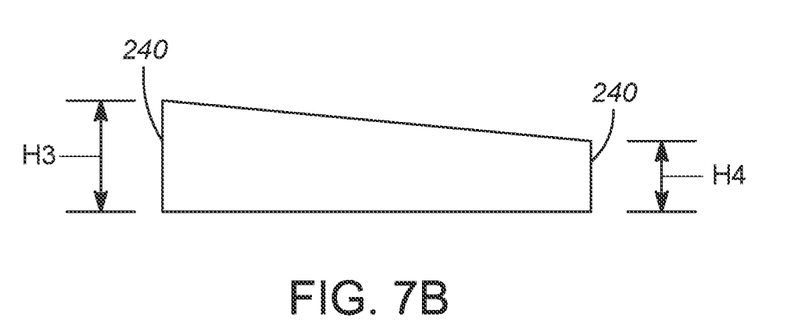
FIG. 7B is an illustration of a bubble promoter with one end higher than the other.

In some embodiments, the height H1 of one of the sides 235 of the bubble promoter 225 can be different from the height H2 of the other side 235, as shown in FIG. 7A. In this case, the side closest to the column wall 220 is higher than the side closest to the center of the column so that there is a slight slope toward the center of the column. In some embodiments, the height of H3 of one of the ends 240 of the bubble promoter 225 can be different from the height H4 of the other end 240, as shown in FIG. 7B.

The bubble promoters 225 are positioned over the support ring 215 and the deck 205. A portion A of the bubble promoter 225 extends over the support ring 215 only, a portion B extends over the support ring 215 and the deck 205, and a portion C extends over the deck 205 only.

The bubble promoter 225 defines a zone on the deck 205 having an area of L×W. There are additional openings 230 in the deck 205 under the bubble promoter 225. Most or all of the area covered by the opening 230 is not in the portion of the deck 205 which extends over the support ring 215.

As shown in FIGS. 2 and 6B of the drawing, the additional openings 230, 230' each have a substantially larger open area than the area of the perforations 210, 210' of the tray deck.

In some embodiments, the total active open area of the opening 230 and perforations 210 in the deck 205 under a bubble promoter 225 for vapor to pass through is greater than or equal to the total open area of the bubble promoter 225. The total active open area is the area of the opening 230 and the area of the perforations 210 in the deck 205 under the bubble promoter 225. The total open area of the bubble promoter 225 is the total area of the perforations in the sides 235, ends 240, and top 245.

The large openings 230, 230' under the bubble promoters increase the vapor flow into the area under the bubble promoters in accordance with the total active open area of the bubble promoter as discussed above.

When the perforations 210 on the deck 205 are holes with valves or the like attached, the valves under the bubble promoters 225 are removed.

In some embodiments, the open area inside the bubble promoter 225 between the top of the bubble promoter 225 and the deck 205 is greater than or equal to the total open area of the portion of the bubble promoter 225 directly above the support ring 215. The open area inside the bubble promoter 225 between the top of the bubble promoter 225 and the deck 205 is defined as the length of the bubble promoter 225 at the inner edge of the support ring 215 times the height from the deck 205 to the top of the bubble promoter 225 (L×H in FIGS. 2 and 3). If the bubble promoter 225 has different heights in ends 240 or both, the height "H" of the bubble promoter 225 from the deck 205 is the average height between the deck 205 and the top 245 of the bubble promoter 225 along the inner edge of the support ring 215. The portion of the bubble promoter 225 directly above the support ring 215 is defined as the portion of the bubble promoter 225 above the support ring 215 alone and above the support ring 215 and the deck 205 (the portion above A+B in FIG. 3). The total open area of the portion of the bubble promoter 225 above support ring 215 is the total open area of the perforations in that portion of the bubble promoter 225 (i.e., part of two ends 240 and part of top 245 directly above the support ring 215 (i.e., A+B in FIG. 3) and the side 235 adjacent to column wall 220).

Figure 5:
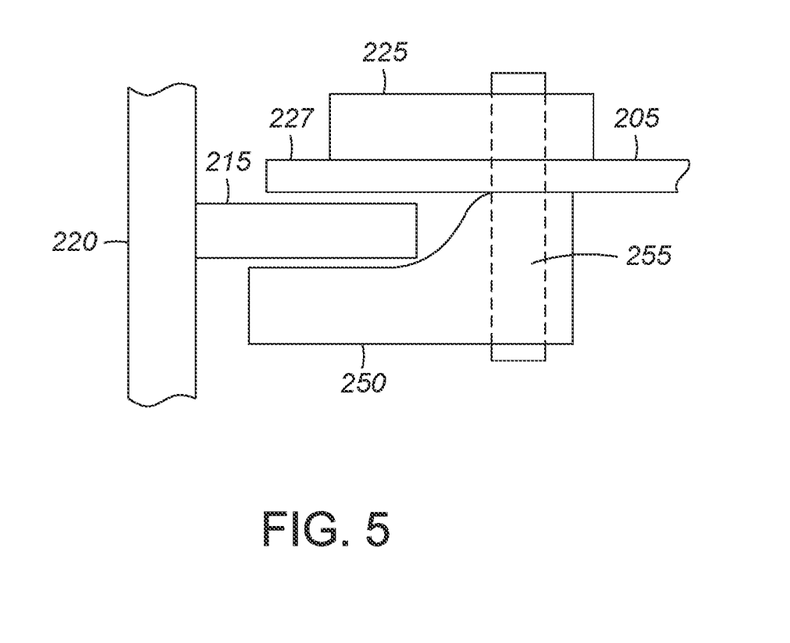
FIG. 5 is an illustration of one embodiment of the attachment of the deck and the support ring bubble promoter to the support ring.

The deck 205 and the bubble promoter 225 can be secured to the support ring 215 using a ring clip 250 and a connector 255, as shown in FIG. 5. Suitable connectors 255 include, but are not limited to, bolts or wedge pin lugs. The connector 255 is attached with the ring clip 250 and passes through the deck 205 and the bubble promoter 225. In some embodiments, washers and nuts are used with the connector 255 above the bubble promoter 225 for tightening the ring clip 250 to the bottom surface of the support ring 215 when the connectors 255 are bolts. In other embodiments, wedge pins are used with the connector 255 above the bubble promoter 225 for tightening the ring clip 250 to the bottom surface of the support ring 215 when the connectors 255 are wedge pin lugs.

FIG. 6A-6C shows bubble promoters 225' used with support beams 275. The tray 200' has perforations 210'. The bubble promoters 225' are positioned over the support beam 275 and the deck. The bubble promoter 225' defines a zone on the deck having an area of L'×W'. There are openings 230' in the deck under the bubble promoter 225' adjacent to the support beam 275.

Specific Embodiments

While the following is described in conjunction with specific embodiments, it will be understood that this description is intended to illustrate and not limit the scope of the preceding description and the appended claims.

A first embodiment of the invention is a tray comprising a deck; at least one downcomer; a plurality of bubble promoters, each bubble promoter defining a zone on the deck, the zone having at least one opening in the deck, the opening being positioned adjacent to a solid support for the tray, a total active open area under the bubble promoter being greater than or equal to a total open area of the bubble promoter. An embodiment of the invention is one, any or all of prior embodiments in this paragraph up through the first embodiment in this paragraph wherein the solid support comprises a support ring located around a circumference of a column and wherein the bubble promoters are positioned adjacent to an outer edge of the tray and across at least a portion of the support ring, the opening being positioned adjacent to the support ring. An embodiment of the invention is one, any or all of prior embodiments in this paragraph up through the first embodiment in this paragraph wherein the solid support comprises a support beam extending across at least a portion of a column, and wherein the bubble promoters are positioned across at least a portion of the deck above the support beam, the opening being positioned adjacent to the support beam. An embodiment of the invention is one, any or all of prior embodiments in this paragraph up through the first embodiment in this paragraph wherein at least one bubble promoter comprises a pair of side walls, a pair of end walls, a top, and an open bottom. An embodiment of the invention is one, any or all of prior embodiments in this paragraph up through the first embodiment in this paragraph wherein there are perforations in the side walls, the end walls, and the top. An embodiment of the invention is one, any or all of prior embodiments in this paragraph up through the first embodiment in this paragraph wherein a height of one side is different from a height of the other side, or a height of one end is different from a height of the other end, or both. An embodiment of the invention is one, any or all of prior embodiments in this paragraph up through the first embodiment in this paragraph wherein the side walls are parallel, or the end walls are parallel, or both. An embodiment of the invention is one, any or all of prior embodiments in this paragraph up through the first embodiment in this paragraph wherein the side walls are not parallel, or the end walls are not parallel, or both. An embodiment of the invention is one, any or all of prior embodiments in this paragraph up through the first embodiment in this paragraph wherein an open area inside the bubble promoter between a top of the bubble promoter and the deck is greater than or equal to a total open area of a portion of the one bubble promoter directly above the solid support.

A second embodiment of the invention is a mass transfer column comprising a tray comprising a deck; at least one downcomer; a plurality of bubble promoters, each bubble promoter defining a zone on the deck, the zone having an opening in the deck; a support ring for the tray connected to the inside of the column, the opening in the deck being positioned adjacent to the support ring for the tray; and a clip positioned under the support ring and the deck, the clip securing the deck and the bubble promoter to the support ring with a connector through the clip, the deck, and the bubble promoter. An embodiment of the invention is one, any or all of prior embodiments in this paragraph up through the second embodiment in this paragraph wherein the connector is a bolt. An embodiment of the invention is one, any or all of prior embodiments in this paragraph up through the second embodiment in this paragraph wherein the plurality of bubble promoters are positioned adjacent to an outer edge of the tray, the opening being positioned adjacent to the support ring. An embodiment of the invention is one, any or all of prior embodiments in this paragraph up through the second embodiment in this paragraph further comprising a support beam extending across at least a portion of the column, and wherein a second bubble promoter is positioned across at least a portion of the deck above the support beam, the second bubble promoter defining a second zone on the deck, the second zone having a second opening in the deck, the second opening being positioned adjacent to the support beam. An embodiment of the invention is one, any or all of prior embodiments in this paragraph up through the second embodiment in this paragraph wherein at least one bubble promoter comprises a pair of side walls, a pair of end walls, a top, and an open bottom. An embodiment of the invention is one, any or all of prior embodiments in this paragraph up through the second embodiment in this paragraph wherein there are perforations in the side walls, the end walls, and the top. An embodiment of the invention is one, any or all of prior embodiments in this paragraph up through the second embodiment in this paragraph wherein a total active open area under one bubble promoter is greater than or equal to a total open area of the one bubble promoter. An embodiment of the invention is one, any or all of prior embodiments in this paragraph up through the second embodiment in this paragraph wherein an open area inside the bubble promoter between a top of the bubble promoter and the deck is greater than or equal to a total open area of a portion of the one bubble promoter directly above the solid support.

A third embodiment of the invention is a tray comprising a perforated deck; at least one downcomer; a plurality of bubble promoters, each bubble promoter defining a zone on the deck, the zone having at least one opening in the deck, the opening being positioned adjacent to a solid support for the tray, a total active open area under the bubble promoter being greater than or equal to a total open area of the bubble promoter, and an open area inside the bubble promoter between a top of the bubble promoter and the deck being greater than or equal to a total open area of a portion of the one bubble promoter directly above the solid support. An embodiment of the invention is one, any or all of prior embodiments in this paragraph up through the third embodiment in this paragraph wherein the solid support comprises a support ring located around a circumference of a column and wherein the bubble promoters are positioned adjacent to an outer edge of the tray and across at least a portion of the support ring, the opening being positioned adjacent to the support ring. An embodiment of the invention is one, any or all of prior embodiments in this paragraph up through the third embodiment in this paragraph wherein the solid support comprises a support beam extending across at least a portion of a column, and wherein the bubble promoters are positioned across at least a portion of the deck above the support beam, the opening being positioned adjacent to the support beam.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

What is claimed is:

1. A tray comprising:
   a deck comprising a plurality of perforations of substantially uniform size;
   at least one downcomer;
   a plurality of bubble promoters, each bubble promoter defining a zone on the deck, the zone being under the bubble promoter and having at least one opening in the deck in addition to the plurality of perforations, the opening being substantially larger in opening area than the plurality of perforations and being positioned adjacent to a solid support for the tray, a total active open area under the bubble promoter being greater than or equal to a total open area of the bubble promoter, each bubble promoter comprising a pair of side walls, a pair of end walls, a top and an open bottom, wherein there are perforations in the side walls, the end walls, and the top.

2. The tray of claim 1 wherein the solid support comprises a support ring located around a circumference of a column and wherein the bubble promoters are positioned adjacent to an outer edge of the tray and across at least a portion of the support ring, the opening being positioned adjacent to the support ring.

3. The tray of claim 1 wherein the solid support comprises a support beam extending across at least a portion of a column, and wherein the bubble promoters are positioned across at least a portion of the deck above the support beam, the opening being positioned adjacent to the support beam.

4. The tray of claim 1 wherein a height of one side is different from a height of the other side, or a height of one end is different from a height of the other end, or both.

5. The tray of claim 1 wherein the side walls are parallel, or the end walls are parallel, or both.

6. The tray of claim 1 wherein the side walls are not parallel, or the end walls are not parallel, or both.

7. The tray of claim 1 wherein an open area inside the bubble promoter between a top of the bubble promoter and the deck is greater than or equal to a total open area of a portion of the one bubble promoter directly above the solid support.

8. A mass transfer column comprising:
   a tray comprising:
      a deck comprising a plurality of perforations of substantially uniform size;
      at least one downcomer;
      a plurality of bubble promoters, each bubble promoter defining a zone on the deck, the zone being under the bubble promoter and having an opening in the deck in addition to the plurality of perforations, each bubble promoter comprising a pair of side walls, a pair of end walls, a top, and an open bottom, wherein there are perforations in the side walls, the end walls, and the top;
   a support ring for the tray connected to the inside of the column, the opening in the deck substantially larger in opening area than the plurality of perforations and being positioned adjacent to the support ring for the tray; and
   a clip positioned under the support ring and the deck, the clip securing the deck and the bubble promoter to the support ring with a connector through the clip, the deck, and the bubble promoter.

9. The column of claim 8 wherein the connector is a bolt.

10. The column of claim 8 wherein the plurality of bubble promoters are positioned adjacent to an outer edge of the tray, the opening being positioned adjacent to the support ring.

11. The column of claim 8 further comprising a support beam extending across at least a portion of the column, and wherein a second bubble promoter is positioned across at least a portion of the deck above the support beam, the second bubble promoter defining a second zone on the deck, the second zone having a second opening in the deck, the second opening being positioned adjacent to the support beam.

12. The column of claim 8 wherein a total active open area under one bubble promoter is greater than or equal to a total open area of the one bubble promoter.

13. The column of claim 8 wherein an open area inside the bubble promoter between a top of the bubble promoter and the deck is greater than or equal to a total open area of a portion of the one bubble promoter directly above the solid support.

14. A tray comprising:
   a deck comprising a plurality of perforations of substantially uniform size;
   at least one downcomer;
   a plurality of bubble promoters, each bubble promoter defining a zone on the deck, the zone being under the bubble promoter and having at least one opening in the deck in addition to the plurality of perforations, the opening being substantially larger in opening area than the plurality of perforations and being positioned adjacent to a solid support for the tray, a total active open area under the bubble promoter being greater than or equal to a total open area of the bubble promoter, and an open area inside the bubble promoter between a top of the bubble promoter and the deck being greater than or equal to a total open area of a portion of the one bubble promoter directly above the solid support, each bubble promoter comprising a pair of side walls, a pair of end walls, a top, and an open bottom, wherein there are perforations in the side walls, the end walls, and the top.

15. The tray of claim 14 wherein the solid support comprises a support ring located around a circumference of a column and wherein the bubble promoters are positioned adjacent to an outer edge of the tray and across at least a portion of the support ring, the opening being positioned adjacent to the support ring.

16. The tray of claim 14 wherein the solid support comprises a support beam extending across at least a portion of a column, and wherein the bubble promoters are positioned across at least a portion of the deck above the support beam, the opening being positioned adjacent to the support beam.

* * * * *